(12) United States Patent
McTeer

(10) Patent No.: US 6,601,999 B1
(45) Date of Patent: Aug. 5, 2003

(54) VIDEO CAMERA BRACKET

(75) Inventor: Thomas S. McTeer, 3358 Bacon St., Berkley, MI (US) 48072-1172

(73) Assignee: Thomas S. McTeer

( * ) Notice: Subject to any disclaimer, the term of this patent is extended or adjusted under 35 U.S.C. 154(b) by 0 days.

(21) Appl. No.: 10/119,393

(22) Filed: Apr. 11, 2002

(51) Int. Cl.⁷ .............................................. G03B 17/00
(52) U.S. Cl. ...................................... 396/420; 396/422
(58) Field of Search ................................ 396/419, 420, 396/422, 428; 248/187.1; 348/373, 376

(56) References Cited

U.S. PATENT DOCUMENTS

| | | | | |
|---|---|---|---|---|
| 2,746,369 A | * | 5/1956 | Beard et al. ................. | 396/420 |
| 2,753,778 A | | 7/1956 | Tolcher ......................... | 95/86 |
| 3,332,593 A | * | 7/1967 | Fauser .......................... | 396/420 |
| 4,037,763 A | * | 7/1977 | Turchen ....................... | 348/376 |
| 5,332,136 A | | 7/1994 | Rudolph ....................... | 224/185 |
| 5,513,784 A | | 5/1996 | Pretorius ...................... | 224/151 |
| 5,612,756 A | * | 3/1997 | Kardach ....................... | 396/422 |
| 5,749,010 A | | 5/1998 | McCumber .................. | 396/420 |
| 5,749,011 A | | 5/1998 | Nicolaci ....................... | 396/421 |
| 5,787,317 A | | 7/1998 | Robinson, Sr. .............. | 396/420 |
| 5,829,652 A | * | 11/1998 | Denzer et al. ............... | 396/420 |
| 5,890,025 A | | 3/1999 | Hart ............................ | 396/420 |

* cited by examiner

*Primary Examiner*—C. Mahoney
(74) *Attorney, Agent, or Firm*—Charles W. Chandler

(57) ABSTRACT

This invention is related to a camcorder bracket, that may be held by either one or both hands of the user in a variety of positions, and which will support several camcorder accessories and can be disassembled into smaller parts for easy storage and transport. The invention can be configured into different relationships, based on the attached mounting plate, to fit the user's need.

8 Claims, 4 Drawing Sheets

VIDEO CAMERA BRACKET

BACKGROUND AND SUMMARY OF THE INVENTION

This invention relates to video camera brackets commonly used for supporting a hand-held camcorder in front of the viewer's eyes when observing an object, and more particularly to a modular collapsible video camera bracket that may be assembled into several configurations for supporting video camera accessories, as well as providing several options for supporting the video camera while observing a video target.

Video camera brackets are known in the art and may be found in U.S. Pat. No. 5,890,025 issued Mar. 30, 1999 to Paul K. Hart for "Frame Assembly for Supporting a Camera"; U.S. Pat. No. 5,787,317 issued Jul. 28, 1998 to Charles E. Robinson, Sr. for "Shoulder Carrier for Camera"; U.S. Pat. No. 5,749,011 issued May 5, 1998 to John F. Nicolaci for "Camera Stabilizing Mechanism"; U.S. Pat. No. 5,749,010 issued May 5, 1998 to Michael T. McCumber for "Camera Support"; U.S. Pat. No. 5,513,784 issued May 7, 1996 to Andries L. Pretorius for "Carrier Device for Carrying and Holding Appliances"; U.S. Pat. No. 5,332,136 issued Jul. 26, 1994 to John H. Rudolph for "Support Apparatus for an Optical Instrument"; and U.S. Pat. No. 2,753,778 issued Jul. 10, 1956 to John M. Tolcher for "Adjustable Camera Support".

Typically, such prior art patents or inventions limit the number of camera accessories they will hold, in addition to the camera. Further, they limit the carrying conditions available either by one or both hands, and are bulky and expensive.

The preferred embodiment of the invention provides a video camera bracket having a modular design which can be broken down and laid flat for storage. The various components have dimensions that nest inside one another for compactness.

The preferred bracket is designed to hold the new, small camcorders directly in front of the user's eyes as the camcorders were designed, or offset. Placing the accessory bracket on the forward part of the main bracket permits the camera monitor to swing out without interference. The tripod base can be used for non-hand held shooting, or for setting the camera on a tabletop, for desktop editing. The bracket components have wide surfaces for attaching Velcro fasteners. The bracket can be held in several different ways, for either left or right eye shooting, or with the monitor open.

Still further objects and advantages of the invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views, and in which.

DESCRIPTION OF THE PREFERRED EMBODIMENT

Figure 1:
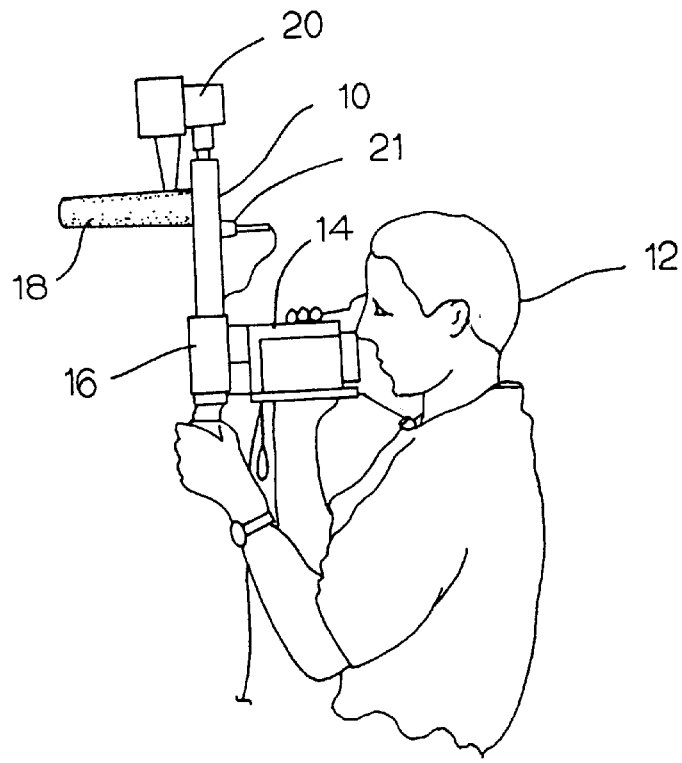
FIG. 1 illustrates a preferred video camera bracket being held by a user.

Referring to the drawings, FIG. 1 illustrates a preferred modular camcorder bracket 10 being held against the body of a user 12. The bracket supports a conventional camcorder 14, a microphone mixer 16, a microphone 18, a light 20, and a wireless microphone receiver 21. Other accessories, not shown, may be mounted on bracket 10, such as monitors, lights, cleaning tapes, gobos, cord ties, microphone mixer, remote controls and a lens cap.

Figure 3:
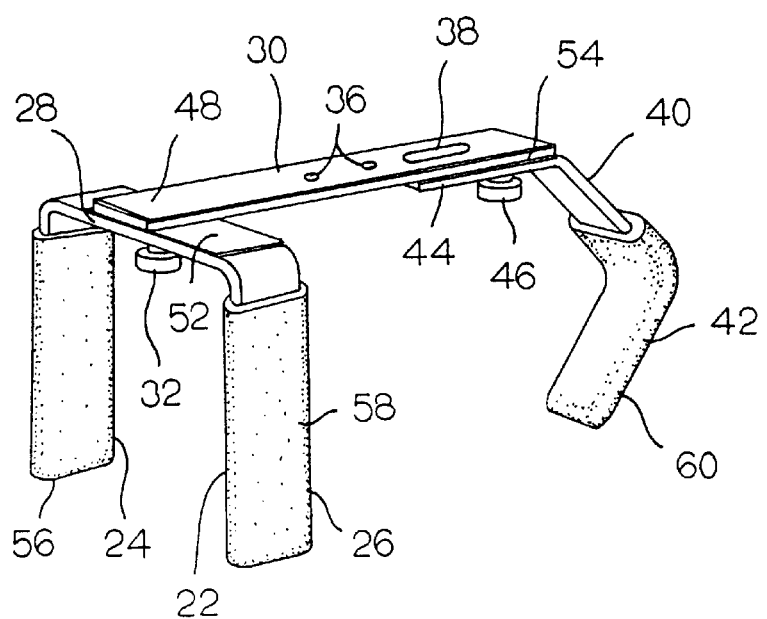
FIG. 3 is a view of the basic tripod component of the preferred bracket.

Referring to FIG. 3, the preferred bracket includes an inverted U-shaped component 22 having a pair of parallel legs 24 and 26 whose lower ends are disposed in a common plane. Component 22 has a horizontal midsection 28 with fastener holes to secure and strengthen a second U-shaped bracket component.

An elongated mounting plate 30 has one end releasably connected by two threaded fastener means 32 to the linear midsection 28 of U-shaped component 22. Mounting plate 30 has a countersunk mounting slot 38 for connecting the plate to camcorder 14, and two tapped holes 36, for mounting plate 30 to a tripod (not shown). The mounting plate can be reversed to locate mounting slot 38 adjacent U-shaped component 22.

A modified V-shaped bracket 40 has a lower leg 42, which also terminates in the same plane as the lower edges of legs 24 and 26 to form a tripod frame useful for supporting the camcorder on a flat, horizontal surface. Bracket 40 has a horizontal variable extension 44 attached by two fastener means 46 (only one shown) to the rear end of mounting plate 30.

Mounting plate 30 has a length sufficient that the camcorder can be mounted on a rubber insulation pad 48 in a position to permit access to camcorder controls and camcorder monitor 50 to be opened without interference. The mounting plate normally remains fastened to the camcorder. V-shaped bracket 40, U-shaped component 22, bracket 61 and L-shaped extension 76 are added as necessary.

A rubber insulation pad 52 is mounted on top of bracket midsection 28. Similarly, a rubber insulation pad 54 is mounted between extension 44 and the rear end of mounting plate 30.

Legs 24, 26 and 42 are each covered with a resilient gripping material 56, 58, and 60, respectively, to provide handgrips for the user to readily grasp the bracket, and to cushion leg 42 when braced against the user's body. The handgrips may be made of wood or plastic.

Figure 4:
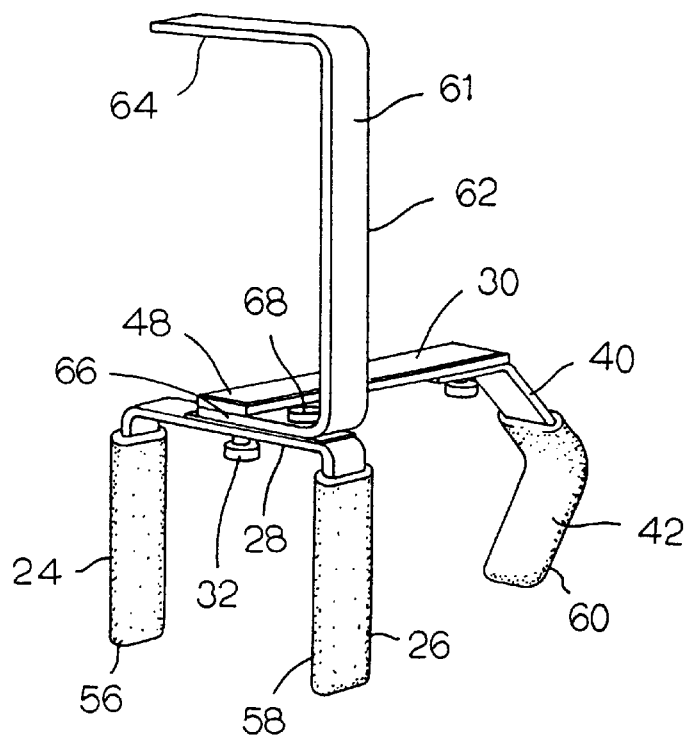
FIG. 4 illustrates a bracket mounted on the tripod base.
Figure 5:
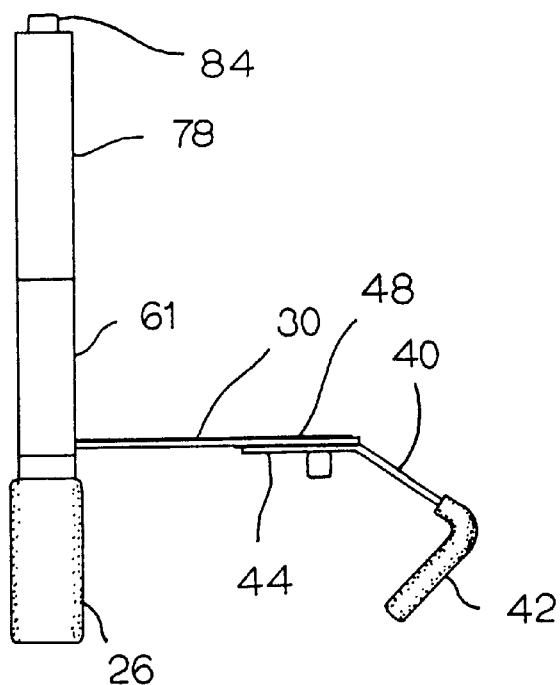
FIG. 5 is a side view of the bracket of FIG. 4.
Figure 6:
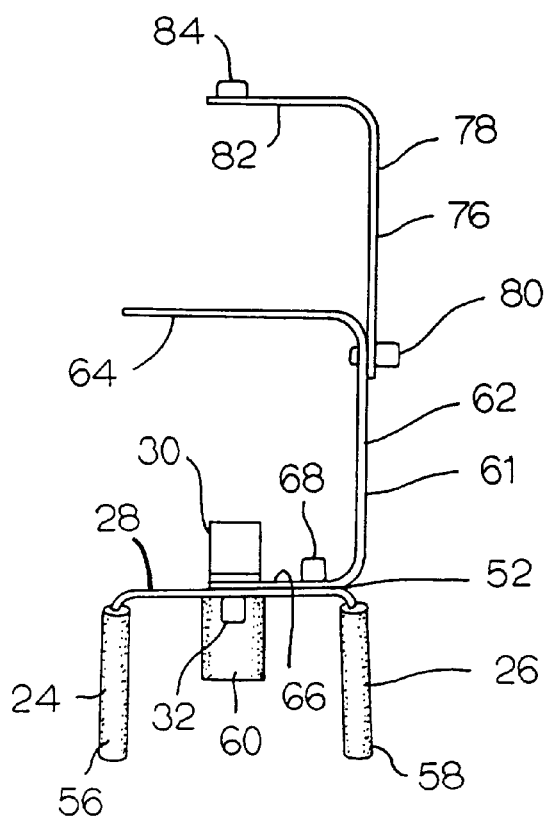
FIG. 6 is view showing an extension added to the bracket of FIG. 6.

Referring to FIGS. 4 and 5, U-shaped bracket 61 has a linear vertical midsection 62, an upper horizontal leg 64 and a lower horizontal leg 66. Lower leg 66 is shorter than upper leg 64 and is parallel to upper leg 64. Both legs 64 and 66 are perpendicular to midsection 62. Midsection 62 has a sufficient height to support accessories above the camcorder while permitting it to have a clear line of sight, while protecting the camera.

An additional fastener member 68 attaches and strengthens lower leg 66 parallel to bracket midsection 28. Fastener member 68 is used for pre-connecting U-shaped component 22 and U-shaped bracket 61 for easier mounting of component 22 to mounting plate 30. Fastener 68 also increases the strength of component 22 and bracket 61 by binding them together, thereby shortening the leverage joint where they are attached to mounting plate 30.

Lower horizontal leg 66 has a sufficient length to releasably connect the extreme end of the lower leg to mounting plate 30 while supporting midsection 62 as a linear extension of leg 26.

Bracket 61 can be easily reversed to dispose midsection 62 above and colinear extension with leg 24.

In some cases a third, L-shaped extension 76 may be mounted on bracket midsection 62. Extension 76 has a vertical leg 78 supported as a linear extension of midsection 62 by releasable fastener 80. A horizontal leg 82 is supported parallel to both leg 64 and bracket midsection 28. Accessory shoe 84 can be mounted on leg 82 for supporting a camera light, or the camera light can be mounted directly on a 25" hole.

Lower U-shaped component 22, upper U-shaped bracket 61, camcorder mounting plate 30, bracket 40, and bracket 61 and extension 76 are all made of aluminum, preferably about 1.5 inches wide, useful for attaching a strip of Velcro, which may be clipped on, or fastened directly to the various accessories.

Referring to FIG. 1, bracket 10 with the camcorder and accessories can be held by two hands grasping the camcorder while leg 42 is braced against the user's chest. As shown in FIG. 1, bracket 10 can also be held by grasping horizontal leg 82. Bracket 10 can be used for mounting a selected number of accessories in their usual functional position.

Figure 2:
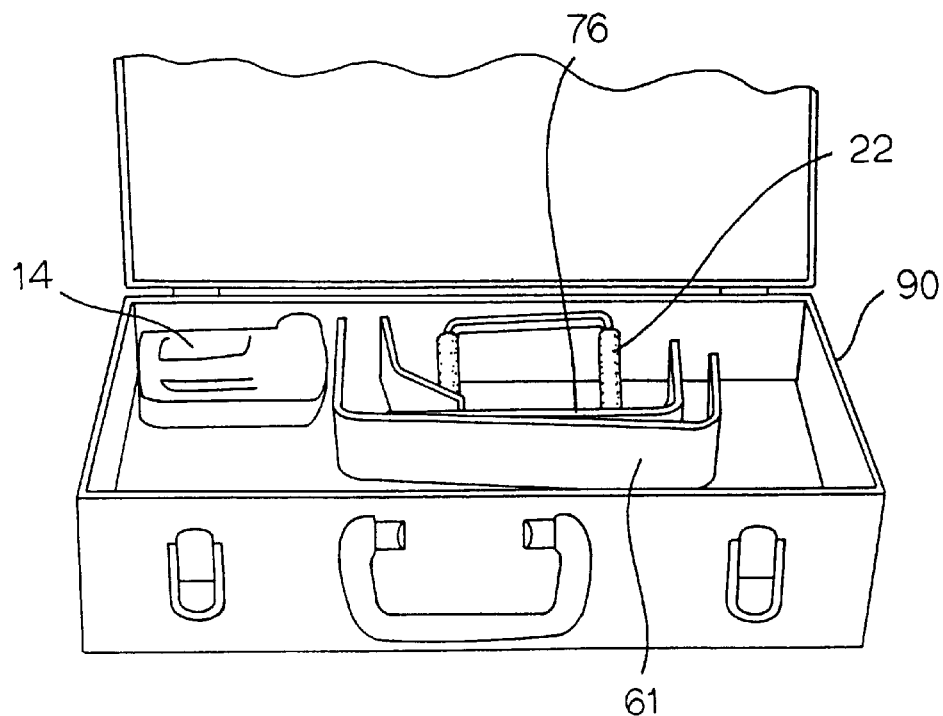
FIG. 2 is a view of a collapsed bracket fitting into a slim case for transport.
Figure 8:
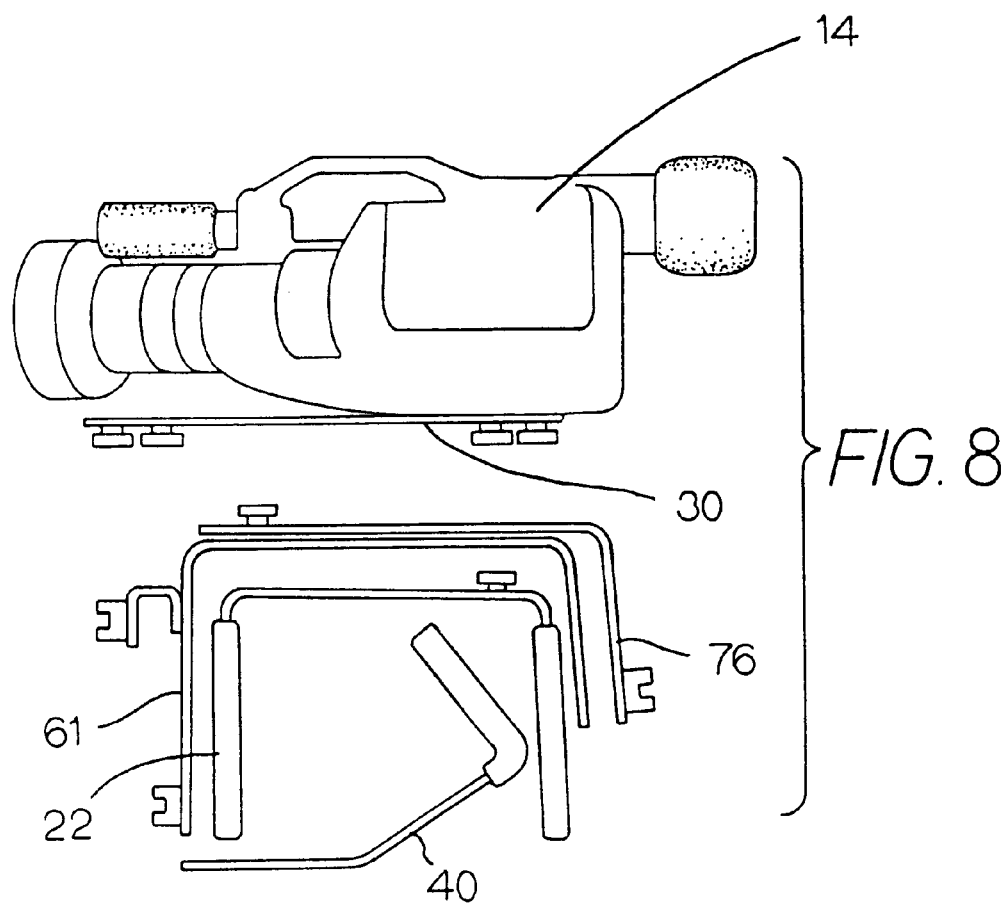
FIG. 8 illustrates a collapsed bracket adjacent a camcorder.

FIG. 2 illustrates what little room is required for storing the various components such as U-shaped bracket 61, U-shaped component 22, which nests within bracket 61, and extension 76, as well as camcorder 14 and various accessories in a case 90. This knockdown or modular arrangement provides means for readily carrying the camcorder and its various accessories, as well as permitting bracket 10 to be assembled into a functional configuration. Extension 76 folds down on bracket 61, nesting against leg 66 as shown in FIG. 8. These items can be stored while connected together for quicker setup assembly. Extension 76 can be pivoted at fastener 80 to change the angle of horizontal leg 82, to adjust the angle of accessory light 20.

Figure 7:
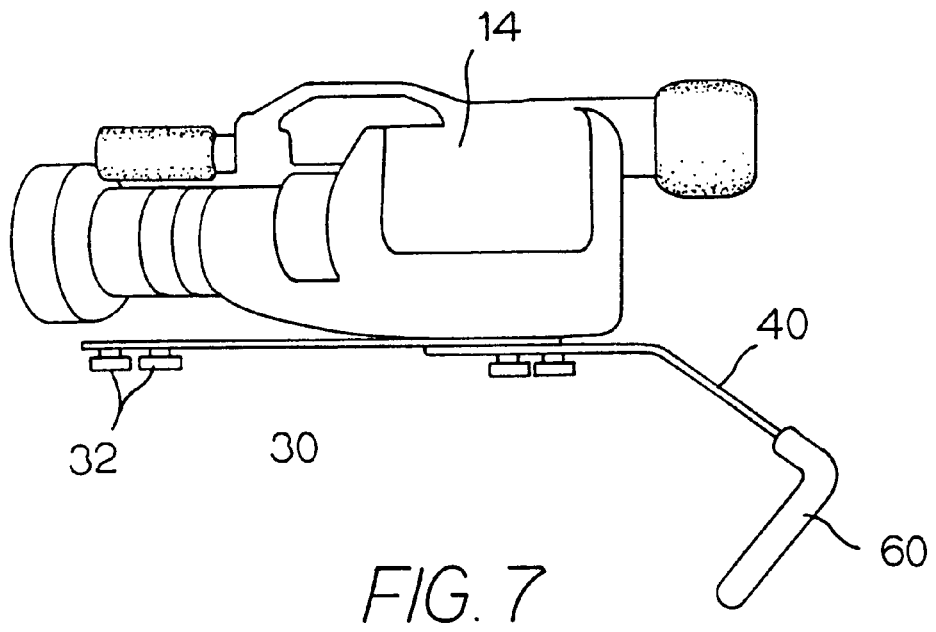
FIG. 7 illustrates a camcorder and the bracket with only the tailpiece.

The camcorder bracket can be assembled in several different configurations, such as, connecting mounting plate 30 to either V-shaped bracket 40; as shown in FIG. 7, or with bracket 40 and U-shaped component 22 to form a self-supporting structure; or with bracket 40, U-shaped component 22 and bracket 61; or with bracket 61 and extension 76.

Having described my invention, I claim:

1. A camcorder bracket, comprising:
   a first U-shaped support member having a pair of parallel legs and an elongated midsection;
   an elongated camcorder mounting plate having a reversible camcorder mounting position, a first end releasably connected to the midsection of the first U-shaped support member and a second end;
   a generally V-shaped, body-engaging bracket having a first leg releasably connected to the second end of the camcorder mounting plate, and a second lower leg disposed to engage either the body engaging bracket alone, or to cooperate with the parallel legs of the U-shaped support member to form a tripod or an alternative hand-gripping area;
   a second U-shaped support member having a first leg, a second parallel leg, and a linear midsection; and
   fastener means for releasably connecting the first leg of the second U-shaped support member in a parallel position on the midsection of the first U-shaped member such that the midsection of the second U-shaped support member forms a linear extension with one of the parallel legs of the first U-shaped member; and the second leg of the second U-shaped support member is disposed in a spaced parallel relationship to the midsection of the first U-shaped support member.

2. A camcorder bracket as defined in claim 1, including a one-piece L-shaped member having a first leg, and a second leg at right angles to the first leg; means for releasably fastening the first leg thereof to the midsection of the second U-shaped support member so that the second leg of the L-shaped member is disposed in a spaced parallel relationship to the midsection of the first U-shaped support member, and means for releasably fastening a first camcorder accessory to the midsection of the first U-shaped support member, a second, camcorder accessory to the second leg of the second U-shaped member, and another camcorder accessory to the second leg of the L-shaped member.

3. A camcorder bracket as defined in claim 2, including means for fastening camcorder accessories to the midsection of the second U-shaped support member.

4. A camcorder bracket as defined in claim 3, including resilient gripping means on the lower leg of the V-shaped body engaging bracket, and the parallel legs of the first U-shaped support member, whereby a camcorder mounted on the mounting plate may be supported in a shooting position by the user grasping any two of the three legs.

5. A camcorder bracket as defined in claim 1, in which a second U-shaped support member has a midsection disposed sufficiently forward of the camcorder mounting position to permit access to camcorder controls, and permit a camcorder monitor to be opened without interference with the second U-shaped support member.

6. A camcorder bracket as defined in claim 1, including a first rubber-shock insulation pad disposed between the camcorder mounting plate, and the first U-shaped support member, and a second rubber-shock insulation pad disposed between the camcorder mounting plate and the U-shaped body engaging bracket.

7. A camcorder bracket as defined in claim 1, in which the first shaped support member may be nested with the second U-shaped and L-shaped support member for a low profile transport position.

8. A modular camcorder bracket, comprising:
   an elongated linear camcorder mounting plate having a camcorder mounting position, a first end and a second end;
   a first U-shaped support member having a pair of parallel legs and an elongated midsection fastened to the first end of the mounting plate;
   a generally V-shaped, body-engaging bracket having a first leg releasably connected to the second end of the camcorder mounting plate, and a second lower leg disposed to engage the body alone of a user, the second leg being disposed on the opposite side of the mounting plate as the camcorder mounting position.

* * * * *